United States Patent [19]
Reed et al.

[11] Patent Number: 4,595,186
[45] Date of Patent: Jun. 17, 1986

[54] ROTATING WELDING FIXTURE

[76] Inventors: Richard A. Reed, 18 Minerva St., Oswego, N.Y. 13126; William J. Kidd, P. O. Box 219, Hannibal, N.Y. 13074

[21] Appl. No.: 683,924
[22] Filed: Dec. 20, 1984
[51] Int. Cl.⁴ ............................................. B23Q 1/04
[52] U.S. Cl. ........................................ 269/69; 269/88; 269/93; 269/243
[58] Field of Search ............... 269/69, 91, 93, 900, 269/41, 43, 88, 37, 243; 228/49 B, 44.5

[56] References Cited

U.S. PATENT DOCUMENTS 1,005,010 10/1911 Farnsworth ............................ 269/91
4,429,861 2/1984 Range ..................................... 269/69

*Primary Examiner*—Robert C. Watson
*Attorney, Agent, or Firm*—Bruns and Wall

[57] ABSTRACT

A rotating welding fixture for holding a pipe fitting against a welding table so that socket welds can be fabricated in one continuous operation. A locking dowel is passed into an opening in the fitting and the fitting locked between the table top and the dowel so that the entire weld region is fully exposed to the welding rod. The table is rotatably supported in a base so that the work can be turned past the welding rod to complete the weld without having to break the weld bead.

5 Claims, 5 Drawing Figures

U.S. Patent   Jun. 17, 1986   Sheet 1 of 2   4,595,186
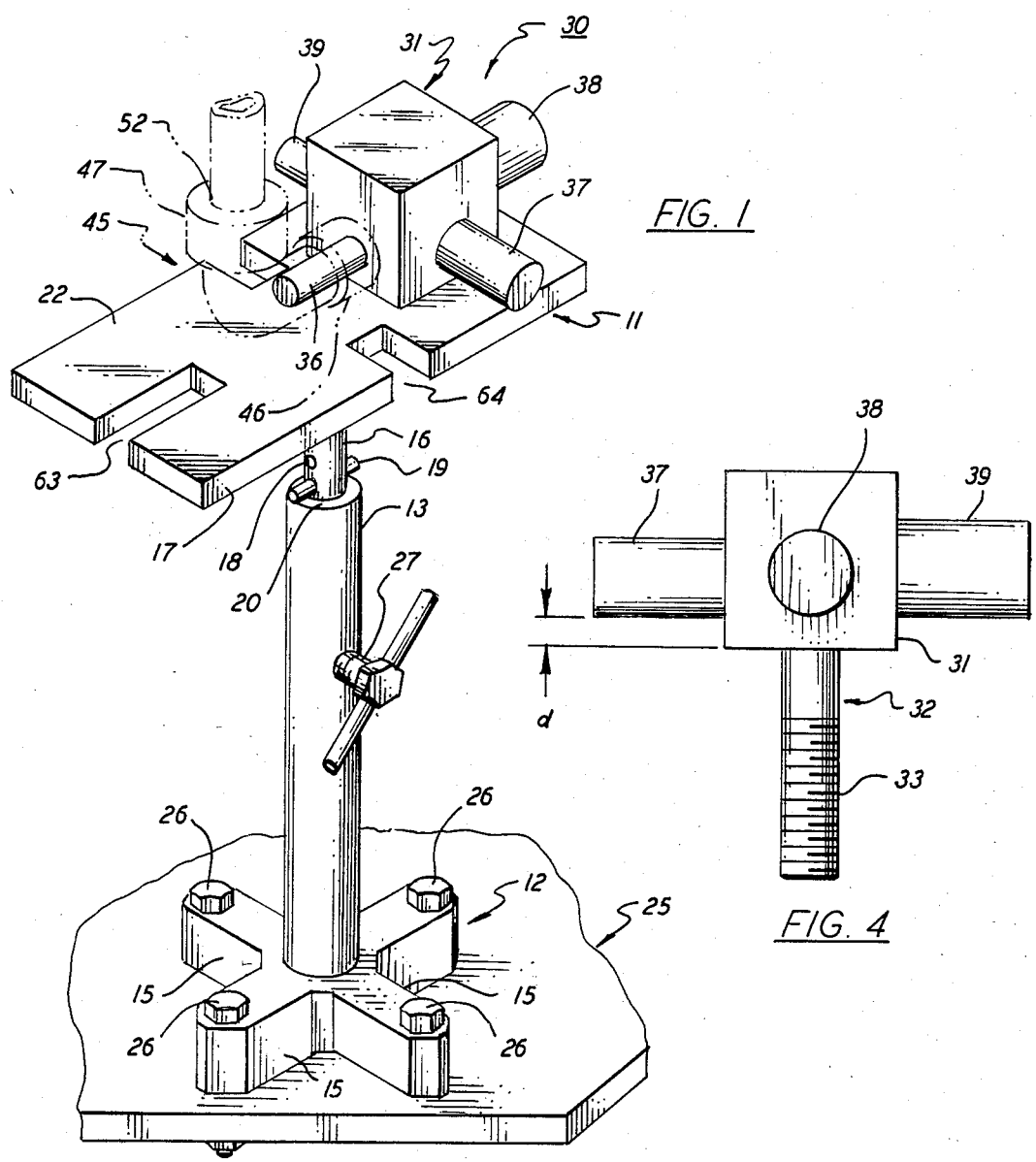
FIG. 1
FIG. 4
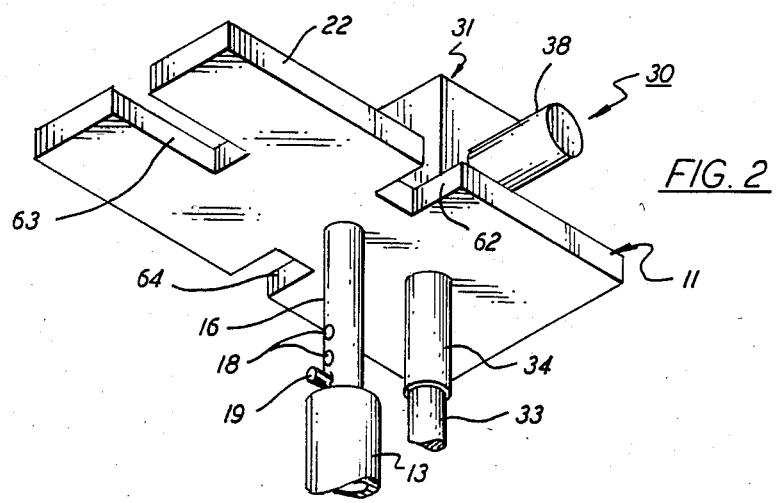
FIG. 2

ROTATING WELDING FIXTURE

BACKGROUND OF THE INVENTION

This invention relates to a fixture for locking a pipe fitting to a rotatable welding table so that a socket weld can be formed in one continuous operation without removing the fitting from the fixture.

Many pipe fittings in use today are provided with sockets that are capable of receiving a pipe section therein. The weld is usually closed by running a bead about the joint region between the pipe and the fitting. This type of weld is generally referred to as a socket weld. One of the difficulties encountered by steam fitters when attempting to form a socket weld is the inability of the welder to run a bead about the circular joint region in one continuous operation. Breaking the bead before completion of the weld can create a number of problems. Attempting to pick up the bead after it has been broken requires a good deal of skill on the part of the welder. If the operation is improperly carried out, the integrity of the weld can be adversely effected. Furthermore striking the arc a number of times along the path of the bead produces unwanted sputtering of the weld material outside the weld area. Having to make and break the bead a number of times extends the time needed to complete the operation thereby lowering the productivity of the worker while, at the same time, raising the cost of fabrication.

Many pipe fittings today are arc welded in the field upon relatively large stationary tables or work benches which do not permit the welder to move freely about the work. The many lines servicing the equipment also severely limit, the welders mobility and, as a consequence, the work sometimes must be repositioned one or more times before a typical socket weld is completed. Pipe fittings requiring socket welds are generally secured to the table using C-clamps or other vice-like holding fixtures having coacting jaws that are designed to close over the work. A portion of the weld joint region is thus usually shielded from the welding rod by the jaws again necessitating repositioning of the work a number of times before the weld can be completed. As noted, interruption of the weld and repositioning of the work wastes a good deal of valuable time and can under certain conditions adversely effect the integrity of the weld.

Devices showing the use of clamps or vice jaws to secure pipes or pipe fittings in holding fixtures are shown in the U.S. Pat. Nos. 2,883,184; 3,971,552; and 4,363,475. A pipe fitting stand having an adjustable cradle for supporting a typical sanitary drain is shown in U.S. Pat. No. 2,853,771. Similarly, a fixture for holding a piston rod pin while it is being inserted into a rod is described in U.S. Pat. No. 2,070,380. These devices, however, do not lend themselves for use in securing pipe fixtures to a welding bench because, in all cases, the jaws of the fixture close over a good portion of the work piece and thus shield at least a portion of the weld area from this welding rod.

SUMMARY OF THE INVENTION

It is therefore an object of the present invention to improve fixtures for holding pipe fittings to a welding table.

A further object of the present invention is to provide a welding fixture for pipe fittings that permits the work to be freely rotated past a welder while it is secured to the table so that a continuous weld can be formed along a circular socket joint.

A still further object of the present invention involves a table for arc-welding pipe fittings which contains a clamping fixture that allows the welding rod free access to a socket joint.

Another object of the present invention is to provide a welding fixture for pipe fittings having interchangeable clamping jaws that are arranged to act against an internal surface of the fitting to lock the fitting against the table.

These and other objects of the present invention are attained by means of a welding table having a top planar working surface for supporting a pipe fitting thereon; the table being mounted upon a base for rotation within a plane described by the working surface of the table whereby the fitting moves through a circular path of travel past the welding station. A support block is arranged to move perpendicularly in the table and contains at least one elongated, outwardly disposed, clamping dowel which is receivable within an opening formed in the fitting. A draw bar is operatively connected to the support block to draw the block downwardly toward the table top and thus lock the fitting between the clamping dowel and the table top.

BRIEF DESCRIPTION OF THE DRAWINGS

For a better understanding of these and other objects of the present invention reference is had to the following detailed description of the invention which is to be read in conjunction with the accompanying drawing, wherein:

FIG. 1 is a perspective view of a welding table embodying the teachings of the present invention showing a pipe elbow secured thereto;

FIG. 2 is a partial perspective view of the table shown in FIG. 1 further showing the bottom surface of the table;

FIG. 4 is also an enlarged view of the clamping unit used in conjunction with the present table.

DESCRIPTION OF THE INVENTION

Figure 3:
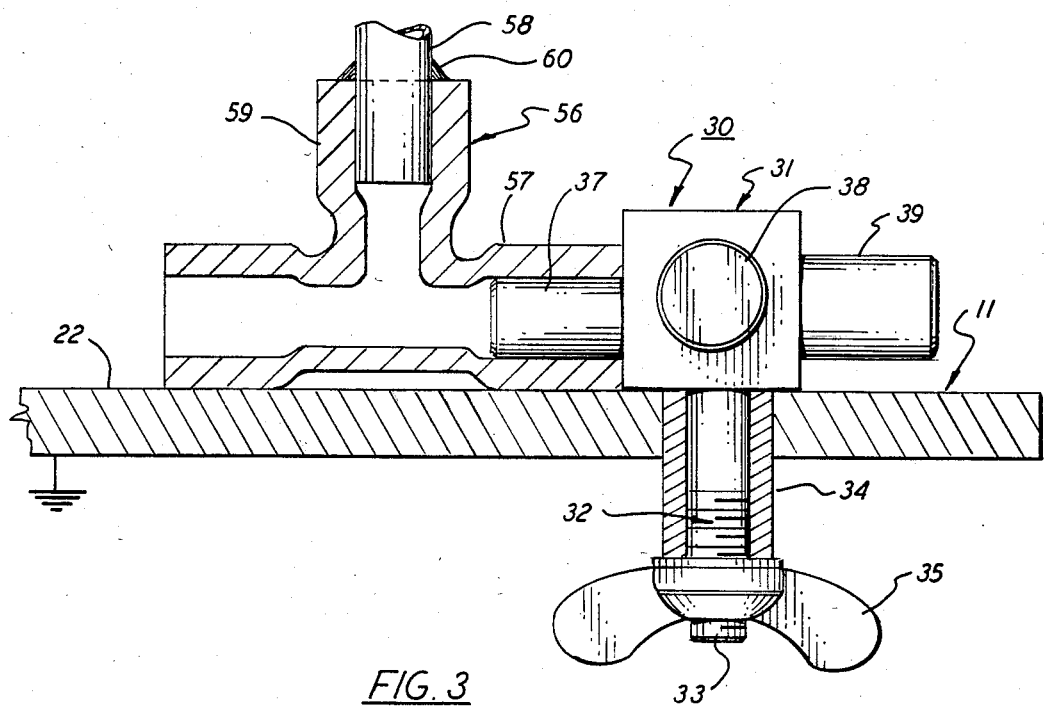
FIG. 3 is an enlarged partial side elevation in section showing a pipe-tee secured to the table of the present invention.

Turning now to the drawings and, in particular to FIG. 1, there is illustrated a rotatable welding fixture 10 that is designed for use by steam fitters or the like to aid in more efficiently and expediently creating highly reliable socket welds within the joint region formed between fittings and pipe sections. As noted above, difficulties are often encountered in the field when attempting to form this type of socket weld. The size of most welding benches prevents the welder from moving freely around the work, and because the external clamping fixtures presently employed in the trade usually have jaws that cover or shield at least a portion of the weld area, the welding rod can not gain access to the entire weld region. Accordingly, the work piece typically has to be repositioned several times before the weld is completed. This, in turn, can adversely effect the quality of the weld and considerably extend the time required to complete the operation.

The present fixture, as shown in FIG. 1, includes a flat table 11 constructed of a suitable metal for providing a grounded surface for the arc welding equipment (not shown) generally used to produce a socket weld. The table is rotatably connected to a stationary base 12. The base includes an upraised cylinder 13 that is attached to four horizontally disposed equally spaced legs 15—15. A vertical spindle 16 is secured as by welding or the like to the bottom surface 17 of the table and is slidably received within the upraised cylinder of the base as shown. A close running fit is provided between the two telescoped members which eliminates unwanted play between the member and thus allows the table to rotate freely in the base without wobbling.

The spindle is provided with a series of holes 18—18 that are spaced apart along a portion of its length. The holes are adapted to receive therein a stop pin 19. The stop pin, in assembly, is seated upon the flat top face 20 (FIG. 1) of the base cylinder 13 and is employed to regulate the depth to which the spindle penetrates the cylinder. As can be seen, the height of the table over the base can thus be easily adjusted by simply repositioning the stop pin 19 within the holes 18—18. The stop pin and the table top are both perpendicularly aligned with the vertical axis of the spindle to permit the table to move freely through 360° of rotation within the desired plane of motion. As will become evident from the disclosure below, this smooth planar motion of the table is an important feature of the invention which greatly facilitates the ability of the welder to form a circular socket weld in a single operation. If required, the spindle can be lubricated in the telescoped region to insure smooth movement of the closely fitted elements.

Most pipe fittings that are welded in the field are relatively small units when compared to other field welded structures. Accordingly, the present fixture is designed to be removably attached to a larger welding bench 25 as shown in FIG. 1. The base of present table is seated upon the bench, preferably at one corner thereof, and the base legs 15—15 secured to the top of the bench using bolts 26—26. The present welding fixture can thus be conveniently removed from the bench when additional bench space is required or when the use of the fixture is required at some remote location. When set up at a remote location, the height of the table is raised to a comfortable working level by suitably repositioning the stop pin within the spindle. A set screw 27 is threaded through the body of the base cylinder and is capable of being locked against the spindle to prevent the table from moving when the work is being set up or when the table is being moved between location.

A clamping unit, generally referenced 30, is operatively mounted in the table. The unit includes a multi-sided block 31, which in this case is a cube, having a downwardly extended draw bar 32 (FIG. 4) attached to the bottom surface thereof. As best illustrated, in FIG. 3, the draw bar, in assembly, is passed downwardly through a tubular member 34 which, in turn, is press fitted or otherwise secured in the table 11.

The lower section of the draw bar is threaded and, in assembly, extends outwardly beyond the lower end face of the tubular member 34. A wing nut 35 is threaded onto the lower end of the bar. The block 31 contains four vertical end faces from which four locking dowels 36-39 are horizontally disposed so that the dowels extend outwardly over the top of the table as illustrated. The dowels are accurately machined to different diameters that complement sockets utilized in standard pipe fittings. As can be seen, the clamping unit is free to rotate in the table so that the horizontally disposed pins can be brought to any desired position over the table top.

As illustrated in FIG. 1, a pipe fitting in the form of an elbow 45 is shown mounted in the present fixture. The elbow contains a pair of end sockets depicted at 46 and 47 each of which is adapted to slidably receive a half inch pipe section such as section 48 therein. A locking dowel 36 that has been machined to the outside diameter of the pipe is passed into socket 46. The opposing socket 47 is placed in an upright or vertical position over the working surface of the table. The dowel is drawn downwardly toward the table by tightening the wing nut 35 against the tubular member 34. The space "d" (FIG. 4) between the bottom surface 49 of the block and the bottom surface of the pin is less than the wall thickness of the elbow in the socket region and, as a result, the fitting is securely clamped between the locking pin and the working surface of the table. This places the elbow in a vice-like grip to hold the elbow in an upright position as shown. Because the locking pin is arranged to act against an internal surface of the fitting, the upraised socket 47 is fully exposed so that it can be reached about its entire periphery by a welding rod.

The pipe section 48 is inserted into the raised socket 47 to establish a circular joint region 52 therebetween. The table is grounded at 53 (FIG. 3) and an arc is struck in the joint region to start the weld bead. Once the bead has been started, the welder can continuously maintain the weld by simply turning the table as the weld progresses. As can be seen, an uninterrupted circular weld can be completed in a single operation without the welder having to move from the work station.

A standard T-fitting 57 is shown mounted in the present fixture in FIG. 3. A selected locking dowel, which in this case is pin 37, is slidably passed into one of the fitting sockets 57 and the fitting locked against the table as described above by tightenting down the wing nut 35. A pipe section 58 is passed into the upraised socket 59 and a socket weld 60 then formed in one rapid and continuous operation. It should be further noted that the clamping unit used in the present fixture can be quickly changed by simply unfastening the wing nut and pulling the draw bar through the tubular fixture 34. A replacement assembly having different sized locking dowels is exchanged for the original. By use of interchangeable units, a wide range of fittings can be accommodated in the fixture.

Figure 5:
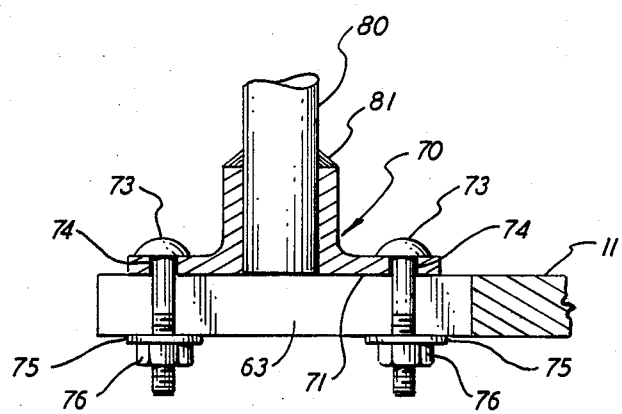
FIG. 5 is also a partial side elevation in section showing a pipe flange secured to the table.

A series of cutouts 62-64 are machined some distance into the side edges of the table as shown in FIG. 2. The cutouts are used to mount pipe flanges of various sizes and shapes upon the working surface of the table. A typical flange 70 is shown in FIG. 5 bolted to the table over cutoff 63. In assembly, the bottom end face 71 of the flange is seated on the working surface of the table over the cutout and carriage bolt 73—73 mounted in opposed flange holes 74—74. The bolts are passed downwardly through the cutout and expanded washers 75—75 are passed thereover. Nuts 76—76 are threaded onto the bolts to lock the flange against the table. A pipe section 80 is slipped into the flange socket as shown and the weld 81 formed in the joint region in a single operation as described above.

While this invention has been described with reference to the structure disclosed herein, it is not confined to the details set forth and this application is intended to cover any modifications or changes as may come within the scope of the following claims.

We claim:

1. Apparatus for supporting a pipe fitting in a position so that the continuous socket weld can be formed between the fitting and a pipe section contained within a socket joint that includes a welding table having a planar working surface, pivot means for rotatably supporting the table within a base so that the table turns in the plane of the working surface, a block operatively associated with the table by means of an adjustable draw bar for selectively positioning the block in regard to the working surface of said table, at least one elongated clamping member outwardly disposed from said block in parallel alignment with the working surface of the table, said member being a circular dowel receivably within an opening contained in the pipe fitting to provide a running fit within said opening, and adjustable means associated with the draw bar for selectively positioning the block in regard to the table to lock the fitting between the clamping member and the working surface of said table.

2. The apparatus of claim 1 wherein the block has a plurality of flat end faces that are each perpendicular disposed in regard to the working surface of the table and an elongated dowel extending outwardly from each end face, each of said dowels being of a different diameter whereby fittings having different size openings can be locked to the table.

3. The apparatus of claim 2 wherein the adjusting means further includes a threaded shank depending from the block which passes downwardly through a clearance hole in the table, and a locking means threaded onto the shank beneath the table that acts between the table and the shank to draw one of the dowels into locking contact against the fitting.

4. The apparatus of claim 1 wherein said table contains at least one cutout extending inwardly from a peripherial edge of the table and bolting means passing through the cutout for holding a pipe flange in an upright position upon the working surface of the table.

5. The apparatus of claim 1 that further includes means to adjust the height of the table.

* * * * *